United States Patent [19]
Brucker et al.

[11] Patent Number: 5,407,755
[45] Date of Patent: Apr. 18, 1995

[54] MULTILAYER MAGNETOOPTIC RECORDING MEDIA

[75] Inventors: Charles F. Brucker, Fairport; Tukaram K. Hatwar, Penfield; Yuan-Sheng Tyan, Webster, all of N.Y.

[73] Assignee: Eastman Kodak Company, Rochester, N.Y.

[21] Appl. No.: 76,326

[22] Filed: Jun. 14, 1993

[51] Int. Cl.⁶ .......................... H01F 1/00; B32B 5/16; G11B 5/66
[52] U.S. Cl. .................... 428/635; 428/668; 428/670; 428/928; 428/611; 428/694 ML; 428/694 MM; 428/694 XS; 428/336; 369/13
[58] Field of Search ............... 428/694 ML, 694 MM, 428/694 DE, 694 XS, 611, 615, 621, 635, 668, 670, 900, 332, 336, 928; 360/135; 369/13

[56] References Cited
U.S. PATENT DOCUMENTS
5,082,749 1/1992 Carcia .......................... 428/694

FOREIGN PATENT DOCUMENTS
0304873 3/1989 European Pat. Off. .
0304927 3/1989 European Pat. Off. .

OTHER PUBLICATIONS
"Dielectric Enhancement Layers for a Co/Pt Multilayer Magnetooptic Recording Medium", Carcia et al, Appl. Phys Lett. 58 (1991), pp. 191–193.
S. Sumi et al, Abstract Mq-3, "Magnetooptic Recording International Symposiump", (MORIS), Dec., 1992, Tuscon, Az.
"Daicure Clear SD-17", a UV curable acrylic resin available from Dainippon Ink and Chemicals, Inc.

Primary Examiner—Paul J. Thibodeau
Assistant Examiner—R. Follett
Attorney, Agent, or Firm—Raymond L. Owens

[57] ABSTRACT

A magnetooptic medium which includes a substrate, a crystalline seed layer of ZnO, and a recording multilayer layer. The seed layer is ZnO, and the recording multilayer includes alternating layers of cobalt/platinum or cobalt/palladium or mixtures thereof.

7 Claims, 6 Drawing Sheets

MULTILAYER MAGNETOOPTIC RECORDING MEDIA

CROSS REFERENCE TO RELATED APPLICATION

Reference is made to commonly assigned pending U.S. patent application Ser. No. 08/076,604, filed Jun. 14, 1993, to Tukaram K. Hatwar et al filed concurrently herewith, the teachings of which are incorporated herein.

FIELD OF THE INVENTION

This invention relates to magnetooptical (MO) recording media having a cobalt/platinum (Co/Pt) or cobalt/palladium (Co/Pd) multilayered structure.

BACKGROUND OF THE INVENTION

Co/Pt multilayers have been used for MO recording media. These materials have perpendicular magnetic anisotropy, large Kerr rotation at short wavelength and excellent environmental stability. However, these materials when deposited by conventional sputtering processes possess low coercivity. Attempts have been made to increase the coercivity by controlling the Co/Pt ratio, using seed layers of metals and dielectrics, and etching the substrate before depositing the multilayer (see Magnetooptic Recording Medium, European Patent Application 0304873 (1988)); Perpendicular Magnetic Recording Media, European Patent Application 0304927 (1989); U.S. Pat. No. 5,082,749; and "Dielectric Enhancement Layers for a Co/Pt Multilayer Magnetooptic Recording Medium", Carcia et al, Appl. Phys Lett. 58 (1991), pages 191–193). For high Co/Pt ratio, even though coercivity up to 1000 Oe can be obtained, the hysteresis loops are not square. For through substrate recording, the use of a metal seed layer is objectionable since it attenuates the Kerr rotation, decreases the figure of merit and decreases the recording sensitivity. Some of the dielectrics such as oxides and nitrides of Zn, In, Al, Ta, Mg, Si, Sn, Fe, Zr, Bi metals increase the coercivity but the thickness of these layers is usually recommended to be more than 100 nm for sufficient enhancement. This also increases the deposition time and lowers the production throughput. Further, the crystalline size of the material is directly proportional to the thickness of the layer. Large crystalline size in thick seed layers may give rise to the noise during the recording process.

Furthermore, most oxides and nitrides are difficult to deposit using simple non-reactive dc sputtering at high deposition rate. The low deposition rate and the large structure thickness require long deposition time, result in low production throughput, induce thermal damage to the sensitive substrate such as PC and gives rise to mechanical stresses causing deformation of the structure. In extreme cases cracking and delamination of the structure may occur.

SUMMARY OF THE INVENTION

It is therefore an object of the present invention to provide an improved magneto optic media structure having a Co/Pt multilayer but with increased coercivity and squareness and manufacturing throughput. This invention provides a solution to problems mentioned above. We have used several polycrystalline materials as seed layers for depositing Co/Pt multilayer media. We found quite unexpectedly that thin layers of zinc oxide (ZnO) when used as seed layers, enhance the coercivity and perpendicular anisotropy of Co/Pt multilayer.

The above object is achieved by a magnetooptic medium comprising:

a substrate, a polycrystalline seed layer of ZnO, and a recording multilayer deposited onto the said seed layer wherein said seed layer has a thickness of less than 20 nm and is selected to improve the coercivity and squareness of the Kerr hysteresis loop of the recording multilayer, said recording multilayer includes alternating layers of cobalt and platinum or cobalt and palladium or cobalt and platinum-palladium alloy.

The following are advantages of magnetooptic media made in accordance with this invention:

a) these seed layers enhance the coercivity and squareness of the Kerr hysteresis loop;
b) these seed layers reduce the writing noise, increase the carrier and hence the general performance of the MO structure;
c) the thinness of the layers allows less deposition time; this reduces the thermal damage to the sensitive substrate and the mechanical stresses of the structure; and
d) the small thickness of the seed layers permits an improved production throughput during manufacturing.

BRIEF DESCRIPTION OF THE DRAWINGS

FIGS. 4a–4e are plots which show a Kerr hysteresis loop for a seed layer structure wherein FIGS. 4a–4d show plots of structure made in accordance with the present invention and FIG. 4e shows a plot of a prior art structure;

DETAILED DESCRIPTION OF THE INVENTION

Figure 1:
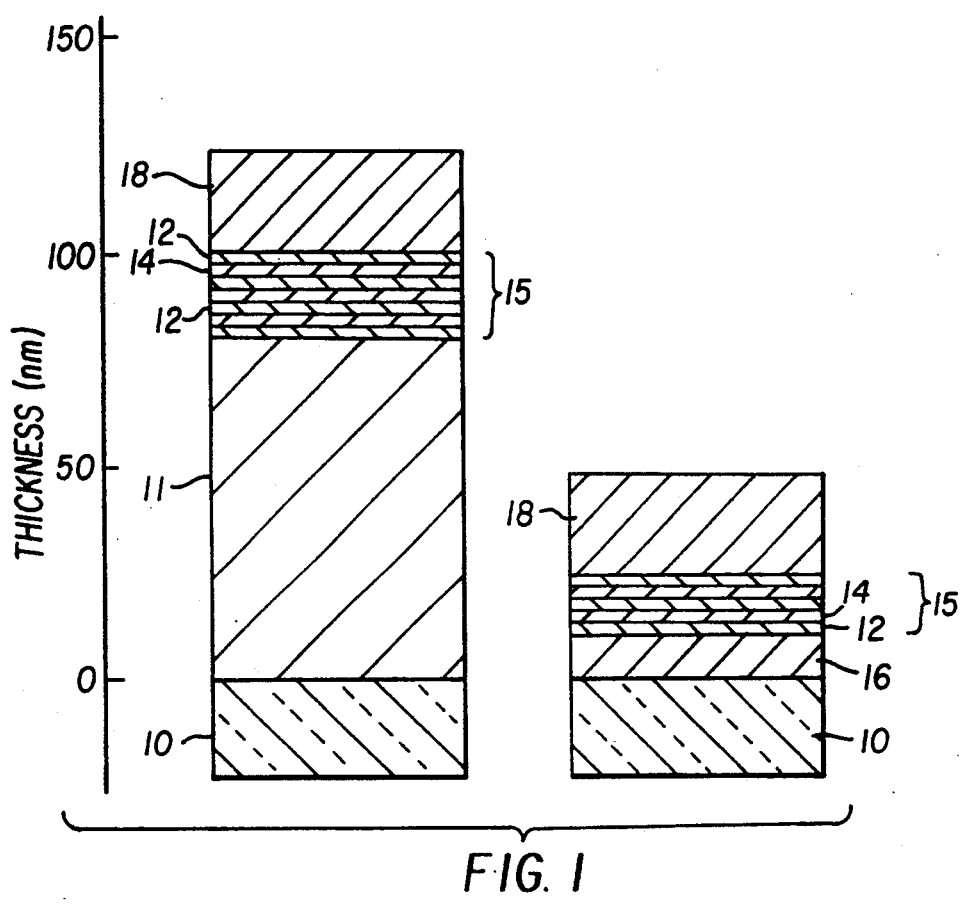
FIG. 1 shows a comparison between a prior art magnetooptic recording structure and one made in accordance with the invention.

Turning first to FIG. 1, a schematic shows a prior art structure on the lefthand side, and on the righthand side, a magnetooptic structure made in accordance with the invention. The prior art structure is shown in S. Sumi et al, Abstract Mq-3, "Magnetooptic Recording International Symposium", (MORIS), December, 1992, Tuscon, Arizona. This drawing shows that magnetoopic structures made in accordance with the present invention require much less thickness than the prior art and the thinness of these layers provide the advantages noted above.

The prior art device includes a substrate 10 which is made of polycarbonate and a thick first dielectric layer 11 made of ZnO. On the ZnO layer is a multilayer recording element 15 having alternating bilayers of Pt layer 12 and Co layer 14. As shown more clearly in FIG. 6, which will be discussed more fully later, the present invention includes a substrate 10 that can be made of glass or polycarbonate. Generally the substrate is transparent as light from a laser or other source will illuminate a recording multilayer structure as described through the substrate. On the substrate are provided a multilayer structure formed alternating layers of Pt layer 12 and Co layer 14. Between the substrate and the multilayered recording element is a thin seed layer 16, which will be discussed later. The Pt layers typically having a range of from 0.4–2 nm and the Co layers have a thickness of 0.2–0.8 nm. Note that the reduced thickness of the seed layer, compared to prior art, permits the use of a thin Co/Pt multilayer while still maintaining the desired media reflectance. For seed layer thickness less than 20 nm, we have found Co/Pt multilayer thickness less than 20 nm is adequate to maintain reflectance. These structures are particularly suitable for use in magnetooptic disk, compact disk (CD) and photo compact disk (Photo CD).

With this type of structure, incident laser light illuminates a particular portion of the substrate, passes through the substrate, and interacts with the multilayered structure changing the Kerr rotation. As is well known, during readout, the Kerr rotation can be monitored to indicate whether a bit has been recorded. This prior art structure has been previously discussed and has a number of problems as noted above.

Figure 2:
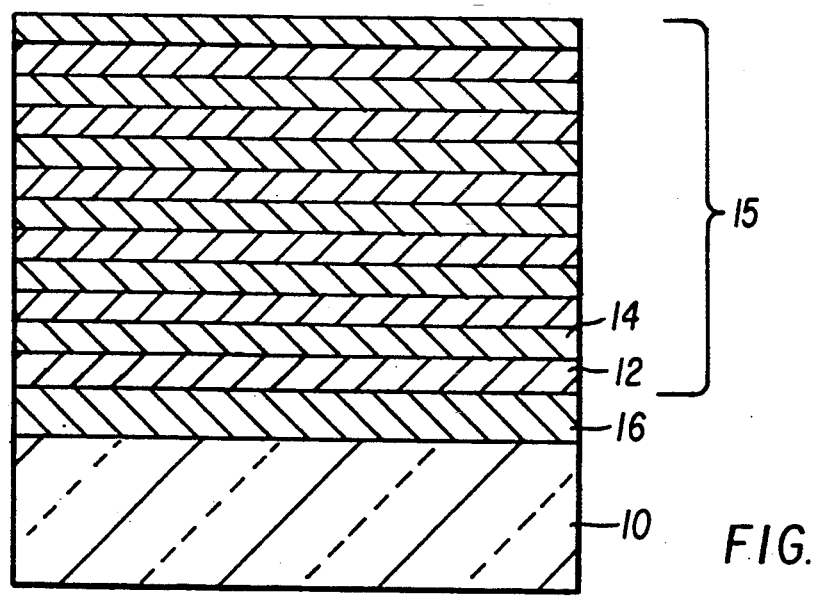
FIG. 2 shows an expanded version of a magnetooptic recording structure similar to FIG. 1 but without an overcoat layer.

Turning now to FIG. 2, we see a very similar structure which can be the same as that in FIG. 1 with the exception that there is no overcoat layer. A number of comparisons will later be made using devices with and without overcoat layers. The seed layer 16, in accordance with the invention, is formed from a thin layer of ZnO. This seed layer is polycrystalline in structure, and provides a number of advantages. The thickness of the seed layer should be less than 20 nm. Preferably, a UV curable lacquer layer is provided over the recording multilayer. This layer is scratch resistant and maintains structural integrity of the media. Also, a dielectric layer can be provided directly on the multilayer recording. This layer may be selected to be the same material as the seed layer or some other material. Its function is to thermally insulate the lacquer layer from the recording multilayer. It also can be selected to provide an optical enahancement function if the media is illuminated by light passing through it (front surface recording).

MAKING MO STRUCTURES

Thin structures of ZnO were prepared by d.c. sputtering a homogenous electrically conducting targets in Ar, Kr, Ar+$O_2$ or Kr+$O_2$ atmosphere. These structures were optically transparent in the 300–900 nm wavelength region. The crystallinity of ZnO structures was analyzed by x-ray diffraction and found to be crystalline.

The Co/Pt multilayers were prepared by d.c. sputtering Co and Pt targets in Ar, Kr or Xe atmosphere. The base pressure before depositing the structures was about $1.2 \times 10^{-6}$ Torr and deposition pressure was about 5–20 mT. Alternate layers of Co and Pt were deposited onto a substrate spinning over the Co and Pt targets. The thickness of each layer was controlled by controlling the deposition rate and the substrate rotation speed. The thickness of Co and Pt were 0.2–0.8 and 0.4–1.8 nm respectively and the number of bilayers was 5–23. A pair of adjacent layers of Pt and Co is referred to as a bilayer.

Several test samples were prepared by depositing the Co/Pt multilayers without and with seed layers on small test samples of glass and polycarbonate (PC) substrates. Structures were also deposited on the 5.25 dia. glass and PC substrates. Structures that were made are shown in FIGS. 1 and 2.

The perpendicular Kerr hysteresis loops were measured at 780 nmwavelength to obtain coercivity (Hc) and the Kerr rotation (Sk) of the structures. The dynamic measurements of the MO structures were made under the following conditions: 5.6–7 m/sec disk velocity, 1 MHz carrier frequency, 33–50% duty cycle, 30 kHz bandwidth, 300 Oe bias field, 0–10 mW write power and 1.5–2.0 mw read power.

EXAMPLES

Figure 3A:
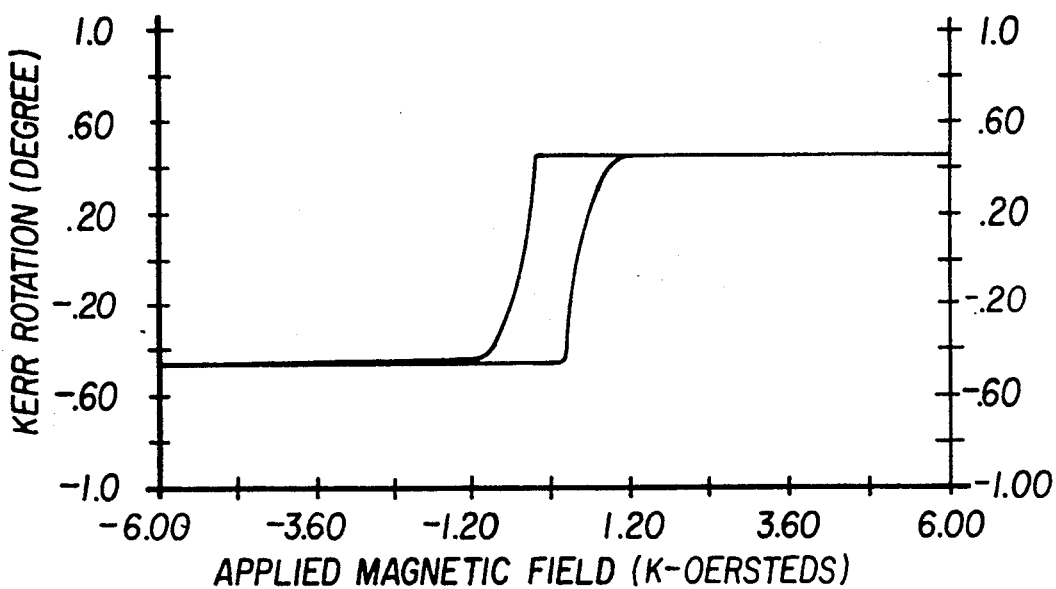
FIG. 3a shows a Kerr hysteresis loop plot without using a seed layer.

A Co/Pt multilayer structure with twelve bilayers was deposited on a 5.25" dia. glass substrate. The thickness of the individual Co and Pt lyers were 0.25 nm and 0.8 nm respectively. The Kerr loop for this structure is shown in FIG. 3(a). Coercivity and the Kerr rotation were 421 Oe and 0.45 degree respectively. FIG. 3a shows the plot of Kerr rotation (degree) versus magnetic field for the structure without a seed layer.

Figure 3B:
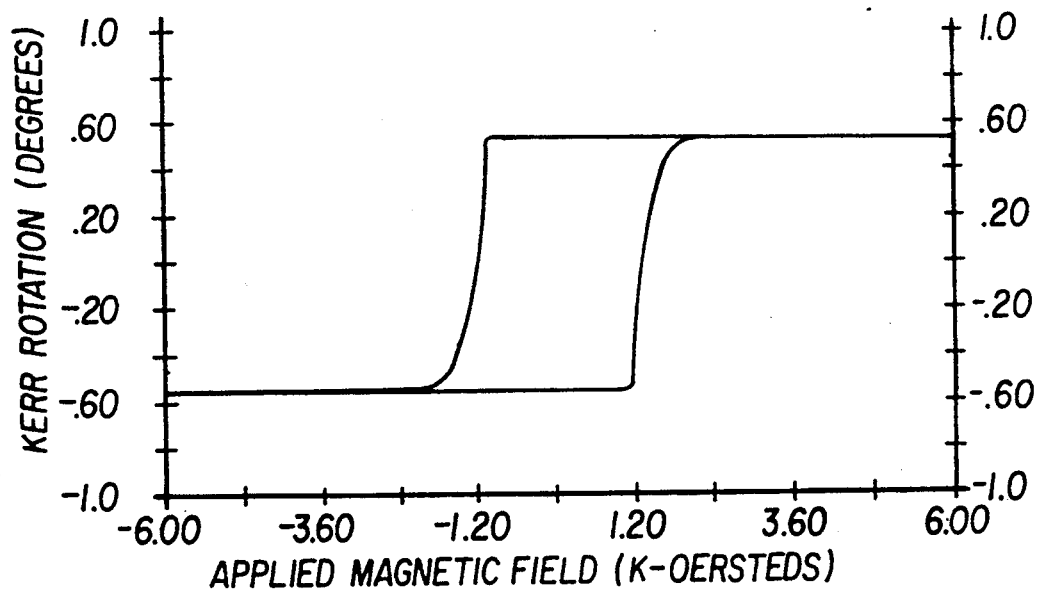
FIG. 3b shows a plot similar to FIG. 3a but with a ZnO seed layer.

Another was prepared under the same conditions first by depositing a 1 nm seed layer of ZnO and then the twelve bilayers of the same composition Co/Pt multilayer structure. The Kerr loop of this structure is shown in FIG. 3b. Surprisingly, the Co/Pt multilayer structure deposited on ZnO seed layer has substantially larger coercivity than that sputtered directly on the substrate. Also the squareness of the Kerr loop is tremendously improved. This improvement in the squareness of the Kerr loop reduces the writing noise during recording.

Figure 4A:
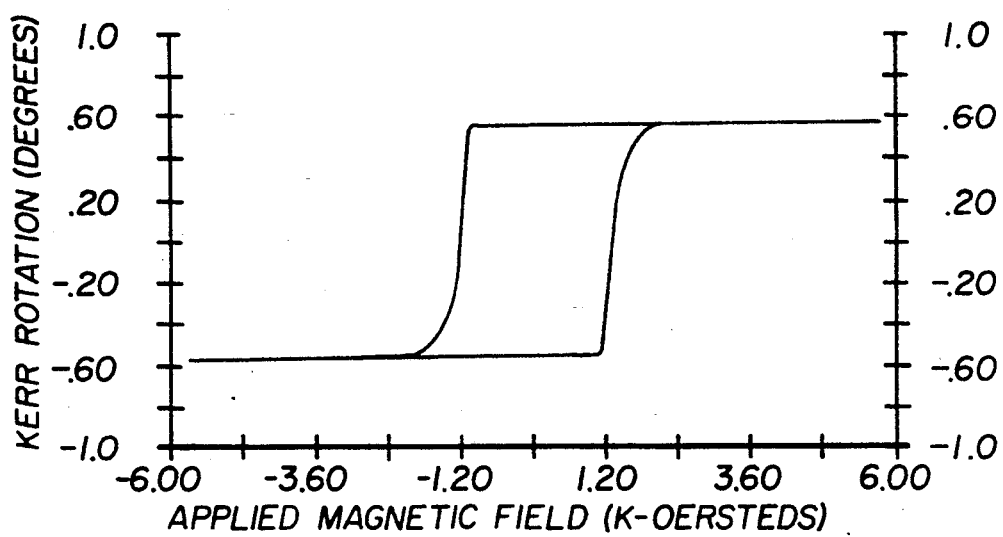
Figure 4B:
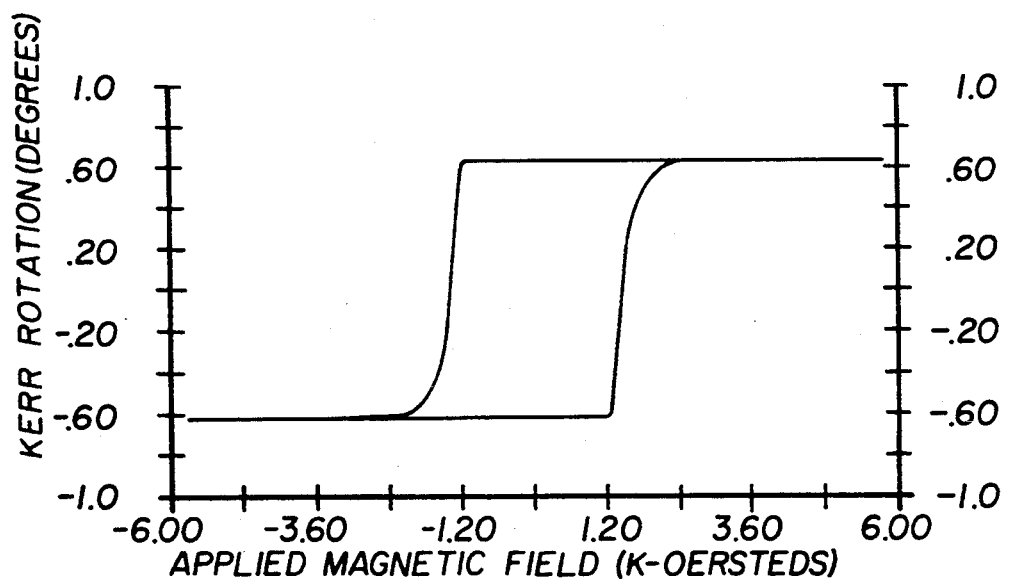
Figure 4C:
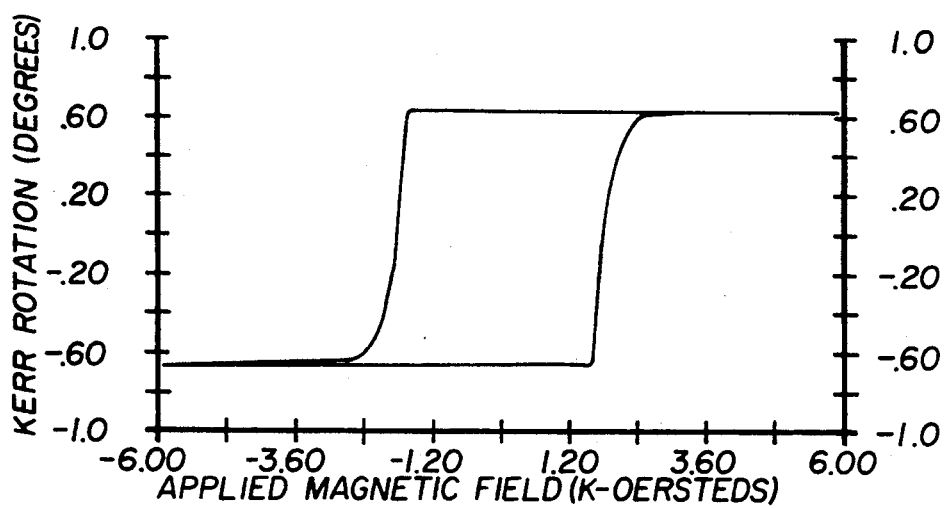
Figure 4D:
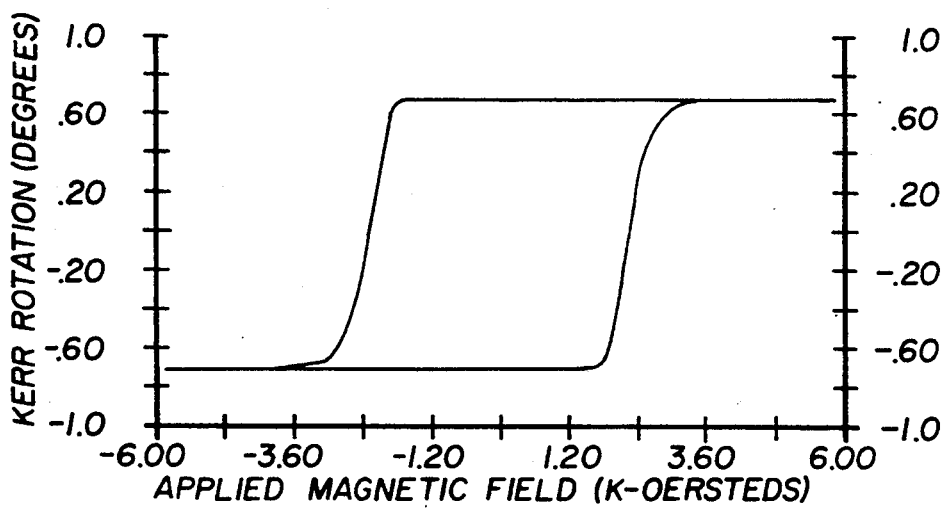
Figure 4E:
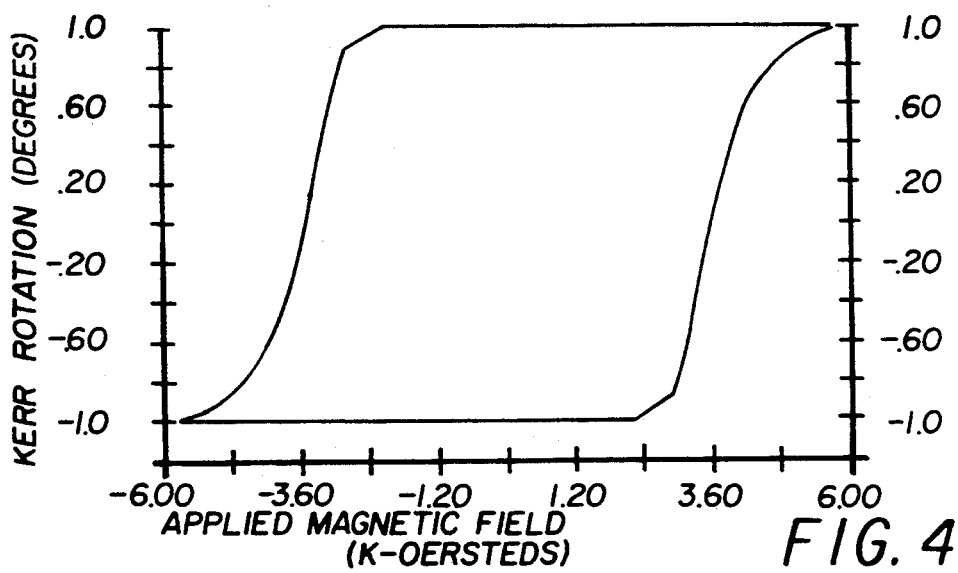

The Kerr loops of the Co/Pt multilayer structures deposited on varying thicknesses of the ZnO seed layers were measured. It was found that even a 0.75 nm thick ZnO seed layer increases the coercivity of the Co/Pt multilayer significantly and improves the squareness of the Kerr loop dramatically. As the thickness of the seed layer increases, both coercivity and Kerr rotation increase monotonically. More specifically with reference to FIGS. 4a–4e, the seed layer ZnO thicknesses are as follows: 4a—1 nm; 4b—5 nm; 4c—10 nm; 4d—20 nm; and 4e—80 nm. It should be noted FIGS. 4a–4d are plots of structures made in accordance with the present invention. FIG. 4e is a plot of a prior art structure. It is quite evident that the coercivity with these structures increases with seed layer thickness, and that is a highly desirable feature. However, as shown, particularly in FIG. 4e, in an 80 nm ZnO seed layer thickness, the squareness becomes a significant problem as the loop is becoming skewed. A skewed loop, of course, will contribute significantly to noise (see FIG. 5a, which shows this high noise level).

Figure 5A:
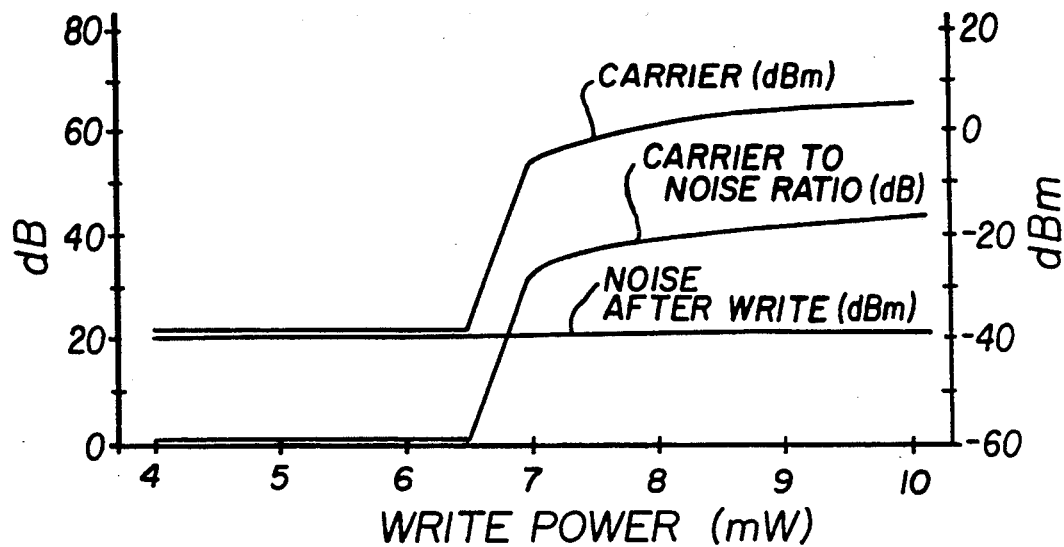
FIGS. 5a and 5b are plots which respectively show carrier signal, noise and carrier to noise ratios as a function of the write power for different MO media structures corresponding to FIGS. 4e and 4a, respectively.
Figure 5B:
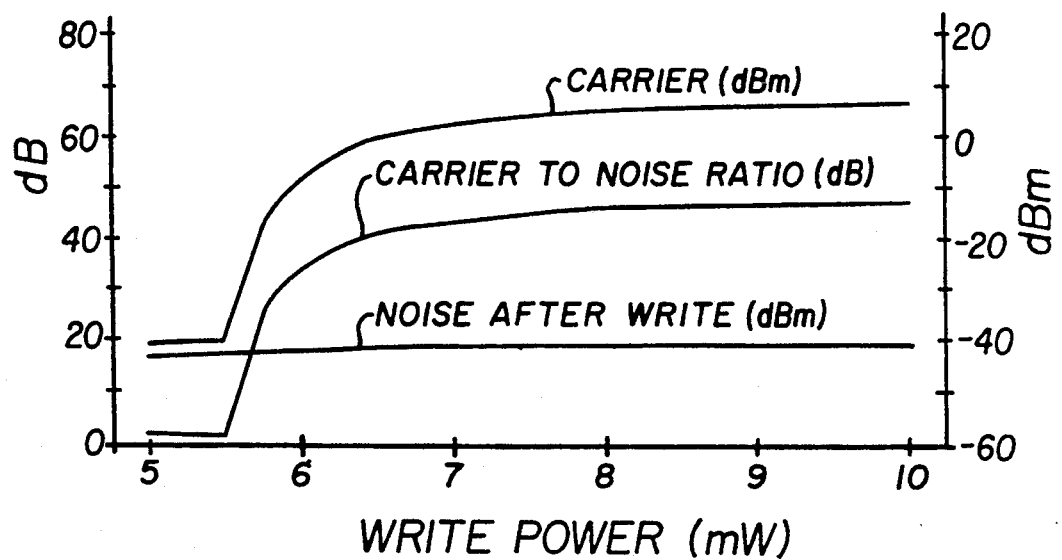

Several full structure disks were prepared by depositing Co/Pt multilayer with or without thin seed layers on 5.25" dia. polycarbonate and glass substrates. These disks were tested for dynamic performance. FIGS. 5a and 5b show the carrier (C), noise (N) and carrier to noise ratio (at 0.7 μum mark length, 5.6 m/s disk velocity, 300 Oe bias field, 1.5 mw read power, 1 MHz carrier frequency and 30 kHz bandwidth) as a function of write power obtained for two Co/Pt multilayer disks. Both include a seed layer. In FIG. 5a the seed layer is thick (80 nm) and in FIG. 5b it is a 1 nm ZnO seed layer deposited on a PC substrate. The comparison reveals that significantly lower noise and a higher CNR is obtained in the MO structure with thin ZnO seed layer.

In FIG. 5b we see the improvement in the reduction of noise using a 1 nm ZnO which has noise lowered by 2 dB with reference to FIG. 5A (80 nm ZnO seed layer). In the above referenced '749 patent to Garcia, we see a loop structure in FIG. 2 which is very similar to that shown in FIG. 4e. Garcia, in order to square this loop, performed an additional sputter etching step in order to attempt to improve squareness. This is not necessary with structures made in accordance with the present invention.

Figure 6:
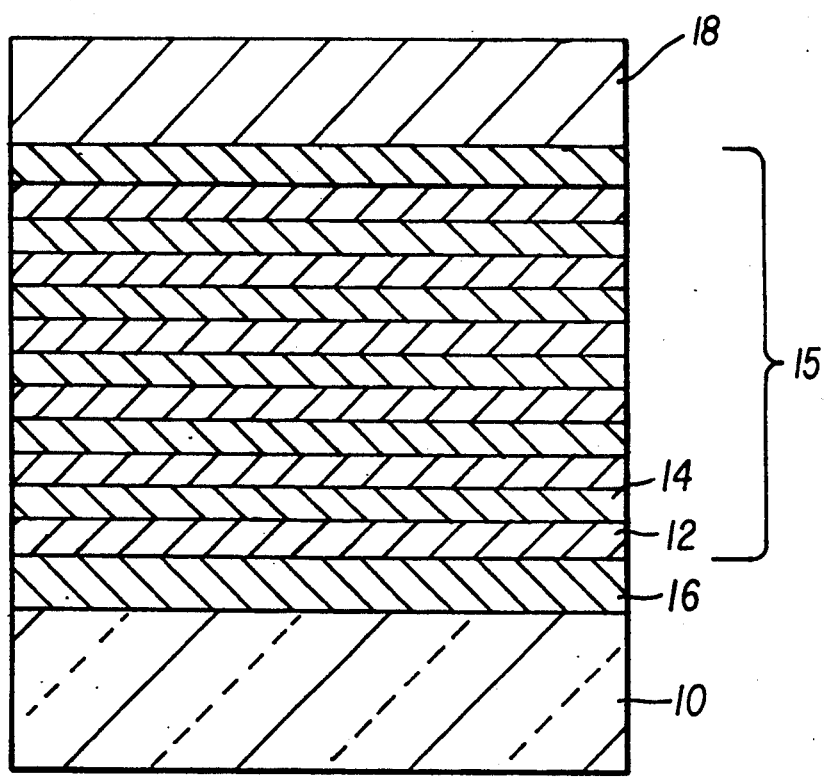
FIG. 6 is a schematic of an MO structure having the Co/Pt multilayer disk structure with a seed layer and overcoated with a protective organic lacquer in accordance with the invention.

Turning now to FIG. 6 which shows another MO structure in accordance with the invention but which includes a UV cured lacquer overlayer 18. An example of such a lacquer is "Daicure Clear SD-17", a UV curable acrylic resin available from Dainippon Ink and Chemicals, Inc. The lacquer is typically applied by a spin coating technique and cured in the presence of UV light. This arrangement improves stability of the Co/Pt multilayer media. We found that even though Co/Pt multilayers have good chemical (corrosion and oxidation resistance) and thermal stability, they do not have good mechanical durability. We also observed the degradation of carrier level and increase in the bit error rate (BER) by repetitive write/erase process. This was ascribed to the deformation or delamination of the multilayer structure from the substrate surface. For putting Co/Pt multilayer media into a practical applications, we improved mechanical durability of these structures by overcoating the MO structure with a protective layer of UV cure organic lacquer. UV resin was overcoated as a protective layer about 5-10 um thick by spin coating method.

Dynamic performance of the Co/Pt multilayer disk with a 1 nm ZnO seed layer was measured before and after an UV cure lacquer overcoat. It indicated that the optimum recording power increased with the lacquer overcoat without significantly affecting the carrier and noise levels.

The improvement in the reliability of the MO structure with the lacquer overcoat was quantified by measuring the deformation signal as function of write power for various Co/Pt disks with and without a protective lacquer overcoat. In this case, recording was done as a function of power level on a disk using a separate track for each writing power level. The MO structure was then bulk erased using a 15 kOe magnet to eliminate all MO signal. The residual signal was read from the individual track using the sum mode of the dynamic tester. This residual signal was assigned to the deformation of the structure when the MO structure was written with increasing power level. It was found that there was almost no deformation of the lacquer overcoated disks.

The write bit error rate (BER) was measured as a function of the write/erase cycles. Disk without a lacquer overcoat showed a significant increase in the BER with $10^4$ cycles. Whereas the MO structures with the protective lacquer overcoat did not indicate any increase in the BER even after $10^6$ cycles.

The invention has been described in detail with particular reference to certain preferred embodiments thereof, but it will be understood that variations and modifications can be effected within the spirit and scope of the invention.

PARTS LIST 10 substrate
12 Pt layer
14 Co layer
16 Seed layer
18 overlayer

We claim:

1. A magnetooptic medium comprising a substrate, a polycrystalline seed layer of ZnO, and a recording multilayer deposited onto the said seed layer wherein said seed layer has a thickness of less than or equal to 16 nm and is selected to improve the coercivity and squareness of the Kerr hysteresis loop of the recording multilayer, said recording multilayer includes alternating layers of cobalt and platinum or cobalt and palladium or cobalt and platinum-palladium alloy.

2. The magnetooptic recording medium of claim 1 wherein a layer of dielectric material is deposited on the recording multilayer.

3. The magnetooptic medium of claim 2 further including a UV curable lacquer overcoat on the dielectric layer.

4. The magnetooptic medium of claim 1 further including a UV curable lacquer overcoat provided over the multilayer.

5. The magnetooptic recording element of claim 1 wherein the total thickness of the seed layer and the Co/Pt multilayer is less than 40 nm.

6. The magnetooptic recording element of claim 1 wherein the total thickness of the seed layer and the Co/Pt multilayer is less than 20 nm.

7. The magnetooptic recording medium of any one of claims 1-5 wherein said multilayer film contains 5-25 bilayers of Co and Pt, the thickness of each of the co and Pt layers being uniform and between 0.2 to 0.8 nm and 0.4 to 1.8 nm, respectively.

* * * * *